(12) United States Patent
Hao

(10) Patent No.: US 7,291,664 B2
(45) Date of Patent: Nov. 6, 2007

(54) MULTICOMPONENT COMPOSITION FOR PHOTODEGRADABLE AND BIODEGRADABLE PLASTIC ARTICLES AND THE USE THEREOF

(75) Inventor: Benzhong Hao, Beijing (CN)

(73) Assignee: Changtai Han, Beijing (CN)

( * ) Notice: Subject to any disclaimer, the term of this patent is extended or adjusted under 35 U.S.C. 154(b) by 114 days.

(21) Appl. No.: 10/433,751

(22) PCT Filed: Dec. 4, 2001

(86) PCT No.: PCT/CN01/01601

§ 371 (c)(1),
(2), (4) Date: Nov. 4, 2003

(87) PCT Pub. No.: WO02/059195

PCT Pub. Date: Aug. 1, 2002

(65) Prior Publication Data

US 2004/0062884 A1    Apr. 1, 2004

(30) Foreign Application Priority Data

Dec. 6, 2000    (CN)    ................................. 00 1 34169

(51) Int. Cl.
*C08K 3/32*    (2006.01)

(52) U.S. Cl. .................. 524/414; 524/415; 524/416; 524/232; 524/394; 524/398; 524/399; 524/400

(58) Field of Classification Search ................ 524/414, 524/415, 416, 232, 394, 398, 399, 400
See application file for complete search history.

(56) References Cited

U.S. PATENT DOCUMENTS

| | | | | |
|---|---|---|---|---|
| 4,519,161 A | * | 5/1985 | Gilead et al. ..................... | 47/9 |
| 4,939,194 A | * | 7/1990 | Scott et al. ................. | 524/134 |
| 5,205,860 A | * | 4/1993 | Elion .......................... | 106/126 |
| 5,258,422 A | * | 11/1993 | Chang et al. ................ | 523/124 |

FOREIGN PATENT DOCUMENTS

| | | |
|---|---|---|
| CN | 1267681 A | 9/2000 |
| JP | S53-28643 A | 3/1978 |
| JP | H05-43747 A | 2/1993 |
| JP | H08-509750 A | 10/1996 |
| WO | WO 00/59996 A1 | 10/2000 |

* cited by examiner

*Primary Examiner*—Peter D. Mulcahy
(74) *Attorney, Agent, or Firm*—Fish & Neave IP Group Ropes & Gray LLP; James F. Haley, Jr.; Anupama R. Sawkar

(57) ABSTRACT

The invention relates to a multicomponent composition for photodegradable and biodegradable plastic articles, and the use of said composition in the manufacture of various disposable and packaging plastic articles and the articles made therefrom. The multicomponent composition does not contain starch, and is a multicomponent compounded composition of new bioactive material of chitin, casein and the like, with biodegradable aid component, photodegradable and auto-oxidation catalysis component, and nonmetallic minerals and the like. Under natural condition, the degraded material can be utilized by microorganism to release carbon dioxide and water, and acts as an eco-friendly plastic material.

10 Claims, No Drawings

MULTICOMPONENT COMPOSITION FOR PHOTODEGRADABLE AND BIODEGRADABLE PLASTIC ARTICLES AND THE USE THEREOF

TECHNICAL FIELD

This invention relates to a multicomponent composition for photodegradable and biodegradable plastic articles, and the use of said composition in the manufacture of various disposable and packaging plastic articles and the various disposable and packaging plastic articles made therefrom.

BACKGROUND OF THE INVENTION

With the rapid progress of plastics industry, current plastics throughput of the world has far beyond hundred million tons. On the basis of statistics, worldwide synthetic resin throughput in 1999 is 156,700,000 tons. The use thereof has reached every section of national economy as well as every field of daily life. Among them, plastic packaging material and articles account for about 30 percent, approximately 46,000,000 tons. Only for china, consumption of synthetic resin in 1999 is 18,660,000 tons. The articles for plastic packaging are 5 million tons. That is to say, the consumption of plastic articles for packaging is huge.

The rapid increase of plastic consumption and advance of environmental sense of the people make that the research of degradable plastic is increasingly concerned. Recently some patents (for example Chinese patent application No:95191396) reports that new type polymer (such as microorganism polyester, aliphatic polyester, poly(lactic acid) and the like) of structure unit readily affected by light and microorganism is made by use of synthetic method. When this new type polymer is discarded after use, it can be degraded by utilizing the direct effect of illumination or microorganism. The degradability of degradable plastics made by this method is very good, but difficultly applied in great amount in market owes to synthesis difficulty thereof, and high cost.

Other patents (for example Chinese patent application No:98106850.2 and 98101407.0) report a "photodegradable and photodisintegrable" material. They adopt the process that photosensitizer, or the blend of photosensitizer with mineral powder of calcium carbonate, talc and the like is added to plastic raw material. Due to the fact that these materials are only subjected to photodisintegration, the degradation thereof is the change of from chunk to nub, satisfactory results are hardly obtained.

Still other patents (for example Chinese patent application No:95121178 and 99100726.3) report that a "biodegradable starch resin" is made by adding as the inducement of biodegradation, starch to plastic raw material. As is well known, starch can be utilized by microorganism, but the macromolecular of above-mentioned general plastics still hardly degradable. Finally only some pore is leaved in the surface of these "degraded plastic articles", it is difficult to attain degradation in true sense. Additionally, granule of starch is often large, influences mechanical property, and it is difficult to make article of high strength and in thin thickness. At the same time, starch is readily absorbing water, however in the processing, even in the case of very low water content, bubble is also readily produced in the plastic articles. Starch is readily scorched at a high temperature, however the processing temperature of plastic is often high. For example, some companies adopt "biodegradable starch resin" mixed with high density polyethylene, which is blown to manufacture shopping bags, and due to the fact that starch is readily scorched, it is difficult to continuously make film.

All these impose numerous inconvenience to the processing of plastics. That is to say, the prior art can not realize truly degradation of general plastics themselves which are hugely used in the market, eliminate and reduce "white pollution", realize friendliness to environment.

SUMMARY OF THE INVENTION

The object of the invention is to provide a multicomponent composition for photodegradable and biodegradable plastic articles, which can promote degradation of general plastics (mainly including PE, PP, PS, PVC, EVA, ABS, PA, PET and the like) itself which is hugely used in the market, make it eco-friendly after being discarded. The technical solution is that the new multicomponent composition is added to the above-mentioned general plastic material in an amount of 0.1-80 wt %, the result is to obtain various plastic articles which can be completely degraded and automatically consumed in the nature (sunlight, air, humidity, microorganism and the like).

Accordingly, one aspect of the invention is a multicomponent composition for photodegradable and biodegradable plastic articles.

Another aspect of the invention is the use of said multicomponent composition in the manufacture of various disposable and packaging plastic articles.

Still another aspect of the invention is various disposable and packaging plastic articles formed from said multicomponent composition.

DETAILED DESCRIPTION OF THE INVENTION

The embodiment for carrying out the above-mentioned object of the invention is described hereinafter. The photodegradable and biodegradable multicomponent composition of the invention mainly comprises the following components.

1. Biodegradable component: This component does not contain starch, characterized in that it comprises one or more substances selecting from the group consisting of chitin, casein, sodium (or zinc, calcium, magnesium, potassium) phosphate and metal salt of hydrogen phosphate or dihydrogen phosphate, amide derivatives of erucamide and oleamide and the like. The amount thereof is from 0.11 to 10 wt %, more preferably from 5 to 10 wt %.

2. Photodegradable and auto-oxidation catalysis component: This component comprises metal ion organic compound of manganese, zinc, iron, cobalt, and cerium and the like, including one or more substances selecting from the group consisting of ferrocene derivatives, mainly n-octyl ferrocene, n-octanoyl ferrocene, undecylenoyl ferrocene, γ-ferrocenyl butyric acid, γ-ferrocenyl butyl butyrate and the like; thioaminocarboxylate, such as iron diethyl dithiocarbamate, iron dibutyl dithiocarbamate and the like; cobalt (or manganese, zinc, iron, cerium) aliphatic acid compound, such as cobalt (manganese, zinc, iron, cerium) formate, cobalt (manganese, cerium, iron, zinc) acetate, cobalt (manganese, cerium, iron, zinc) oleate, cobalt (manganese, cerium, iron, zinc) laurate, cobalt (manganese, cerium, iron, zinc) stearate, cobalt (manganese, cerium, iron, zinc) cetylate and the like; acyl compound containing the ion of cobalt, manganese, iron and the like, such as cobalt (or manganese, iron) acetylacetonate; and other type compounds, such as dibutyltin laurate and benzophenone and derivatives thereof. The amount thereof is from 0.1 to 8.0 wt %, more preferably from 3 to 8 wt %.

3. Biodegradable aid component: This component is selected from the group consisting of polyhydroxy-containing carboxylate, such as polyethylene glycol stearate, sorbitol palmitate, adduct of sorbitol anhydride laurate with ethylene oxide and the like; epoxidized soybean oil, and epoxy acetyl castor oil and the like. The amount thereof is from 0.1 to 8.0 wt %.

4. Non-metallic minerals: This component is selected from the group consisting of talc, calcium carbonate, kaolin, wollastonite and the like. The amount thereof is from 10 to 90 wt %.

The photodegradable and biodegradable multicomponent composition of the invention is a degradable composite system obtained by compounding the specified amounts of above-mentioned components 1, 2 and 3, or components 1 and 2, and optional one or more substances selected from component 4, with a raw material of polymer resin and the like, and then extrusion pelletizing (or other pelletizing). The composition is added to general plastic raw material in an amount of 0.1-80 wt %. The prepared disposable or packaging degradable plastic article can make macromolecule of polymer gradually change into small molecule oxygen containing compound of very low molecular weight in the nature.

Actual test shows that these oxygen-containing compounds of very low molecular weight is readily utilized by microorganism, release carbon dioxide and water, reaching the effect of being consumed completely in the nature. So it can be new material eliminating and reducing "white pollution" and being eco-friendly.

EXAMPLE

Example 1

A Photodegradable and Biodegradable Multicomponent Composition

The formulation of the photodegradable and biodegradable multicomponent composition is as follows:

| | |
|---|---|
| low density polyethylene resin | 85.8 wt % |
| Chitin | 7.0 wt % |
| Erucamide | 1.6 wt % |
| epoxidized soybean oil | 0.2 wt % |
| monoglyceride stearate | 0.8 wt % |
| epoxy acetyl castor oil | 0.4 wt % |
| γ-ferrocene acyl butyric acid | 3.2 wt % |
| cobalt oleate | 0.8 wt % |
| dibutyltin laurate | 0.2 wt % |

The low density polyethylene is weighed according to the above formulation, and put into a high speed stirred kettle at 50° C. Then the epoxidized soybean oil and epoxy acetyl castor oil are weighed according to formulation amount, and put into the kettle, stirred from 2 to 3 minutes.

Other components are then weighed, and put into the kettle, continuously stirred from 3 to 5 minutes.

The above stirred blend is extrusion pelletized by twin screw extruder (length/diameter ratio of 36:1, the temperature of extrusion sections is from 50 to 200° C., extruder revolution is from 25 to 450 rpm).

Example 2

Controllable Photodegradable and Biodegradable Mulching Film

The particles of multicomponent composition of Example 1 are added to low density polyethylene (or linear low density polyethylene, high density polyethylene) in the amount of 0.2-8 wt %. The amount of polyethylene resin is from 99.8 to 92 wt %.

After homogeneous mixing, the blend is put into the hopper of film extruder set (the extruder set is model PC-65 or others), then extruded and blow molded into film (film thickness is from 0.005 to 0.025 mm). This degradable mulching film has mechanical property which is essentially the same as that of conventional mulching film, and can be covered mechanically. Said degradable mulching film is innoxious to soil and crops, at the same time has good photodegradability and biodegradability. The induction period of said degradable mulching film can be controlled to 45±3 days, 60±5 days, 90±7 days, 120±10 days. Said degradable mulching film can be completely utilized by microorganism in the same year or next year after use to release carbon dioxide and water, and to reach the effect of being completely consumed by farm.

The degradable mulching film of various thicknesses can be made by use of the blend of above-mentioned multicomponent composition with linear low density polyethylene (or with high density polyethylene) in the above ratio. The super thin degradable mulching film having thickness of 0.005 mm can be particularly made, the mechanical property and thermal insulation, and moisture content keeping property thereof completely fulfill the need of farm covering and crops, and moreover the amount of mulching film required for per acre can be greatly reduced. The agriculture investment decreases.

The test results of mechanical property

| Item | Standard value | Test result |
|---|---|---|
| Tensile load N, longitudinal/transverse | ≧1.6 | 1.8/1.6 |
| Elongation at break %, longitudinal/transverse | ≧160 | 300/380 |
| Tear load at 90° N, longitudinal/transverse | ≧0.6 | 0.7/0.9 |

Example 3

Disposable Degradable Plastic Shopping Bag

The particles of multicomponent composition of Example 1 are added to high density polyethylene (for example 7000F of Mitsui Chem Inc.) in the amount of 0.2-8 wt %. The amount of high density polyethylene is from 99.8 to 92 wt %.

After homogeneous mixing, the blend is put into the hopper of blown film extruder (extruder screw diameter of 45 mm, length/diameter ratio of 28:1), and extruded and blow molded into cylindrical film (film thickness is from 0.01 to 0.5 mm). The film is then printed, punched, heat sealed and the like to make disposable packaging bag of various specification such as degradable plastic shopping bag, food bag and the like. The mechanical property of these bags is similar to that of common shopping bag with the same thickness, conforms to the technical demand of disposable plastic shopping bag. The sanitary aspect of the bag conforms to the demand of The National Standard GB9683-88 <<Food Packaging Bag Sanitation Standard>>. Said degradable bag can be degraded to powder within 20 to 80 days after use, such as discarded outdoors, and further be degraded completely by the nature to disappear.

Example 4

A Photodegradable and Biodegradable Multicomponent Composition

The formulation of the photodegradable and biodegradable multicomponent composition is as follows:

| | |
|---|---|
| polyethylene resin | 22.2 wt % |
| casein | 8.0 wt % |
| erucamide | 1.4 wt % |
| cobalt laurate | 6.4 wt % |
| benzophenone | 0.4 wt % |
| dibutyltin laurate | 0.2 wt % |
| epoxidized soybean oil | 0.2 wt % |
| epoxy acetyl castor oil | 0.4 wt % |
| polyethylene glycol stearate | 0.8 wt % |
| Talc | 60 wt % |

The polyethylene resin and talc are weighed according to the above formulation, and put into a high speed stirred kettle at 50° C. Then the epoxidized soybean oil and epoxy acetyl castor oil are weighed according to formulation amount, and put into the kettle. Operation procedure can refer to Example 1. The particles of multicomponent composition are obtained.

Example 5

Disposable Degradable Plastic Tableware

The particles of multicomponent composition of Example 4 are added to high density polyethylene (for example 5121A of Daqing Petrochemical Corporation) or polypropylene (for example 1300 of Yanshan Petrochemical Corporation) or polystyrene (for example 666D of Yanshan Petrochemical Corporation) in the amount of 5-40 wt %, the amount of the resin is from 95 to 60 wt %. The blend is homogeneously mixed and extrusion formed into sheet, and then heat formed to manufacture disposable degradable plastic messtin, noodle bowl, water dinking cup, and tray and the like.

The manufactured tableware conforms to sanitation standard of The National Standard GB9688-88 <<Polypropylene Article for Food Packaging>>. Said tableware can be degraded to powder in the nature within 1 to 4 months after use, such as discarded outdoors, further degraded, and utilized by microorganism to release carbon dioxide and water, reaching the effect of being consumed completely in the nature to disappear.

Example 6

Snack Tableware Including Disposable Degradable Plastic Knife, Fork, and Spoon, and the Like The particles of multicomponent composition of Example 4 are added to polyethylene (polypropylene or polystyrene) mentioned in Example 5 in the amount of 1-10 wt %, and the amount of resin is from 99 to 90 wt %. The blend is homogeneously mixed and put into an injector to manufacture snack tableware including disposable degradable plastic knife, fork, and spoon, and the like. The snack tableware conforms to sanitation standard of The National Standard GB9688-88 <<Polypropylene Article for Food Packaging>>. The degradability is that said tableware can be broken outdoors in the nature within 1 to 2 months, and consumed completely by the nature within 4 to 6 months to disappear.

Example 7

Photodegradable and Biodegradable Water and Soil Conserving Plastic Shield Mesh The particles of multicomponent composition of Example 4 are added to high density polyethylene (for example DGDB2480 of Qilu Petrochemical Corporation), or low density polyethylene (for example 2K1.5A of Yanshan Petrochemical Corporation), or ethylene-vinyl acetate copolymer (for example EVA5/2 of Beijing Organic Chemical Plant) in the amount of 30-80 wt %, and the amount of the resin is from 70 to 20 wt %. The blend is homogeneously mixed and put into the hopper of extruder, formed into mesh through extrusion, to manufacture water and soil conserving plastic shield mesh with different degradation period. Said shield mesh is innoxious to soil and plants before and after use, has good physical mechanical property, can fulfill the demand required for water and soil conserving plastic shield mesh. Finally said shield mesh is also completely degraded, and consumed completely by the nature.

Example 8

Disposable Degradable Plastic Lighter Cover

The particles of multicomponent composition of Example 1 are added to polystyrene or acrylonitrile-styrene copolymer in the amount of 1-6 wt %, and the amount of the resin is from 99 to 94 wt %. The blend is homogeneously mixed and put into an injector to manufacture disposable degradable plastic lighter cover. The physical mechanical property of said lighter cover is similar to that of conventional plastic lighter cover, but it has the property of being degraded favorably in the nature, and acts as eco-friendly plastic material.

I claim:

1. A multicomponent composition for photodegradable and biodegradable plastic articles, said composition consisting of components (1), (2), (3), (4) and (5), or consisting of components (1), (2), (4) and (5):
   (1) a biodegradable component in an amount of 0.1-10 wt %, which does not contain starch, the component comprising one or more substances selected from the group consisting of chitin, casein, sodium phosphate, zinc phosphate, calcium phosphate, magnesium phosphate, potassium phosphate, sodium hydrogen phosphate, zinc hydrogen phosphate, calcium hydrogen phosphate, magnesium hydrogen phosphate, potassium hydrogen phosphate, sodium dihydrogen phosphate, zinc dihydrogen phosphate, calcium dihydrogen phosphate, magnesium dihydrogen phosphate, potassium dihydrogen phosphate, erucamide, and oleamide;
   (2) a photodegradable and auto-oxidation catalysis component in an amount of 0.1-8.0 wt %, the component comprising one or more substances selected from the group consisting of n-octyl ferrocene, n-octanoyl ferrocene, undecylenoyl ferrocene, γ-ferrocenyl butyric acid, γ-ferrocenyl butyl butyrate, iron diethyl dithiocarbamate, iron dibutyl dithiocarbamate, cobalt formate, manganese formate, zinc formate, iron formate, cerium formate, cobalt acetate, manganese acetate, cerium acetate, iron acetate, zinc acetate, cobalt oleate, manganese oleate, cerium oleate, iron oleate, zinc oleate, cobalt laurate, manganese laurate, cerium laurate, iron laurate, zinc laurate, cobalt stearate, manganese stearate, cerium stearate, iron stearate, zinc stearate, cobalt cetylate, manganese cetylate, cerium cetylate, iron cetylate, zinc cetylate, cobalt acetylacetonate, manganese acetylacetonate, iron acetylacetonate, dibutyltin laurate, and benzophenone;

(3) non-metallic minerals in an amount of 10-90 wt %, the minerals comprising one or more substances selected from the group consisting of talc, calcium carbonate, kaolin, and wollastonite;

(4) a biodegradable aid component in an amount of 0.1-8.0 wt %, the biodegradable aid component comprising one or more substances selected from the group consisting of polyhydroxy-containing carboxylate, epoxidized soybean oil, and epoxy acetyl castor oil; and (5) a carrier component in an amount of the balance, the carrier being a resin selected from the group consisting of PE, PP, PS, ABS, EVA, PA, PET, and PVC.

2. The multicomponent composition according to claim 1, characterized in that the amount of biodegradable component (1) is 5-10 wt %.

3. The multicomponent composition according to claim 1, characterized in that the amount of photodegradable and auto-oxidation catalysis component (2) is 3-8 wt %.

4. The multicomponent composition according to claim 1, characterized in that said polyhydroxy-containing carboxylate is selected from the group consisting of polyethylene glycol stearate, sorbitol palmitate, and an adduct of sorbitol anhydride laurate with ethylene oxide.

5. A process for the manufacture of photodegradable and biodegradable disposable or packaging plastic articles, characterized in that the multicomponent composition of any one claims 1 to 4 is added to a plastic resin in an amount of 0.1-80 wt %, and formed into various photodegradable and biodegradable disposable or packaging plastic articles by using one or more plastics processing methods.

6. A disposable or packaging plastic article, characterized in that it is formed from the multicomponent composition according to any one of claims 1 to 4.

7. The disposable or packaging plastic article according to claim 6 selected from the group consisting of a controllable photodegradable and biodegradable plastic agricultural film, a disposable degradable plastic shopping bag, a disposable degradable plastic food bag, a photodegradable and biodegradable water and soil conserving plastic shield mesh, and a disposable degradable plastic lighter cover.

8. The disposable or packaging plastic article according to claim 6, characterized in that the article is tableware selected from the group consisting of a disposable photodegradable and biodegradable plastic mess tin, a disposable photodegradable and biodegradable plastic noodle bowl, a disposable photodegradable and biodegradable plastic water drinking cup, and a disposable photodegradable and biodegradable plastic tray.

9. The disposable and packaging plastic article according to claim 6, characterized in that the article is snack tableware selected from the group consisting of a disposable degradable plastic knife, a disposable degradable plastic fork, and a disposable degradable plastic spoon.

10. A multicomponent composition for photodegradable and biodegradable plastic articles, said composition consisting of components (1), (2), (3), (4) and (5), or consisting of components (1), (2), (4) and (5):

(1) a biodegradable component in an amount of 0.1-10 wt %, which does not contain starch, the component comprising one or more substances selected from the group consisting of chitin, casein, sodium phosphate, zinc phosphate, calcium phosphate, magnesium phosphate, potassium phosphate, sodium hydrogen phosphate, zinc hydrogen phosphate, calcium hydrogen phosphate, magnesium hydrogen phosphate, potassium hydrogen phosphate, sodium dihydrogen phosphate, zinc dihydrogen phosphate, calcium dihydrogen phosphate, magnesium dihydrogen phosphate, potassium dihydrogen phosphate, amide derivatives of erucamide, and amide derivatives of oleamide;

(2) a photodegradable and auto-oxidation catalysis component in an amount of 0.1-8.0 wt %, the component comprising one or more substances selected from the group consisting of ferrocene derivatives, thioaminocarboxylates, cobalt aliphatic acid compounds, manganese aliphatic acid compounds, zinc aliphatic acid compounds, iron aliphatic acid compounds, cerium aliphatic acid compounds, cobalt acyl compounds, manganese acyl compounds, iron acyl compounds, dibutyltin laurate, and benzophenone derivatives;

(3) non-metallic minerals in an amount of 10-90 wt %, the minerals comprising one or more substances selected from the group consisting of talc, calcium carbonate, kaolin, and wollastonite;

(4) a biodegradable aid component in an amount of 0.1-8.0 wt %, the biodegradable aid component comprising one or more substances selected from the group consisting of polyhydroxy-containing carboxylate, epoxidized soybean oil, and epoxy acetyl castor oil; and (5) a carrier component in an amount of the balance, the carrier being a resin.

* * * * *